July 20, 1965 L. C. CARTER ETAL 3,195,924

BOOK COVER BOARDS AND BOARD STRUCTURES AND APPARATUS AND METHOD FOR MAKING THE SAME

Filed Dec. 26, 1962 5 Sheets-Sheet 1

LEEWOOD C. CARTER
EDWARD K. MULLEN INVENTORS

BY Kenyon & Kenyon

ATTORNEYS

July 20, 1965 L. C. CARTER ETAL 3,195,924

BOOK COVER BOARDS AND BOARD STRUCTURES AND APPARATUS AND METHOD FOR MAKING THE SAME

Filed Dec. 26, 1962 5 Sheets-Sheet 2

LEEWOOD C. CARTER
EDWARD K. MULLEN
INVENTORS

BY Kenyon & Kenyon

ATTORNEYS

LEEWOOD C. CARTER
EDWARD K. MULLEN INVENTORS
BY
Kenyon & Kenyon
ATTORNEYS

LEEWOOD C. CARTER
EDWARD K. MULLEN
INVENTORS
BY
Kenyon & Kenyon
ATTORNEYS

July 20, 1965 L. C. CARTER ETAL 3,195,924

BOOK COVER BOARDS AND BOARD STRUCTURES AND APPARATUS AND METHOD FOR MAKING THE SAME

Filed Dec. 26, 1962 5 Sheets-Sheet 5

LEEWOOD C. CARTER
EDWARD K. MULLEN INVENTORS

BY

Kenyon & Kenyon

ATTORNEYS

United States Patent Office 3,195,924
Patented July 20, 1965

3,195,924

BOOK COVER BOARDS AND BOARD STRUCTURES AND APPARATUS AND METHOD FOR MAKING THE SAME

Leewood C. Carter and Edward K. Mullen, Westfield, N.J., assignors to Book Covers, Incorporated, Newark, N.J., a corporation of New Jersey Filed Dec. 26, 1962, Ser. No. 246,966
17 Claims. (Cl. 281—29)

This invention relates to book cover boards, looseleaf cover boards, ring binder cover boards, and album or catalogue cover boards, and to an apparatus and method for making the same. It relates particularly to a cover board structure having leaf boards and a spine board of multi-layer construction, and to an apparatus and method for making the same. It relates more particularly to a cover board structure having leaf boards hinged in spaced relation to a spine board, and to an apparatus and method for making the same. It relates still more particularly to a cover board structure of the kind just described which is completely and continuously jacketed inside and outside, and to an apparatus and method of making the same. It relates even still more particularly to a cover board structure of the kind just described which has leaf boards with rounded corners and a spine board which is curved and also formed with holes for ring binder rivets, and to an apparatus and method for making the same.

It is an object of this invention to provide a cover board structure comprising a spine board, two leaf boards each in spaced relation to the spine board, and a strip of hinge material joining the leaf and spine boards, the hinge material being of such a nature that both inside and outside cover jackets of vinyl sheet material may be sealed to it by heat, and themselves perform a hinging function to give a very strong three-layer hinge structure. This object is achieved by making the hinge strip of such material as polyvinylacetate coated paper, vinyl impregnated cloth, or pure vinyl film.

It is another object of this invention to provide a cover board structure making method whereby at least two continuous streams of material of a nature suitable for use in loose-leaf cover leaf and spine boards are laminated and formed into a plurality of continuous two-layer streams of material, the edges of whose layers are extremely accurately aligned at widths equal to the widths of the spine board and the two leaf boards of the loose-leaf cover desired to be produced. This object is achieved by first generating two continous streams of material such as chipboard, each such stream having a width at least somewhat greater than the combined widths of the spine board and the two leaf boards of the book cover desired to be produced; next bringing these streams into at least rough superimposed running alignment, applying a bonding material onto at least one stream on its face directed toward the other stream, and pressing the two streams together to effect a bond between them and thereby generate a single continuous two-layer stream of leaf board and spine board material. Next a trimming cut along each edge of this initial two-layer stream to remove at least some material from each edge of each of its layers and simultaneously slitting cuts are made to divide the trimmed stream into two streams of leaf board material and one or more interposed streams of spine board material.

It is another object of this invention to provide a cover board structure making apparatus wherein there are guide means adapted to be fed with a continuous stream of spine board material and two continuous streams of leaf board material each initially running essentially contiguously with the stream of spine board material, and to separate these three streams so that they run in essentially parallel and controllably spaced relation with the stream of spine board material between the streams of leaf board material.

It is another object of this invention to provide a cover board structure making apparatus wherein there are pressing means adapted to be fed with a continuous stream of spine board material, a continuous stream of leaf board material in spaced relation on either side of the stream of spine board material, and a continuous stream of adhesive hinge material more or less centrally aligned with the stream of spine board material, and to urge the stream of hinge material against the whole of one side of the stream of spine board material and at least an edge portion of each of the streams of leaf board material and thereby join the streams of leaf board and spine board material.

It is another object to this invention to provide a cover board structure making apparatus wherein there are indenting means adapted to be fed with a continuous stream of book cover material comprising a stream of spine board material, a stream of leaf board material in spaced relation on either side of the stream of spine board material, and a stream of hinge material adhering to the whole of one side of the stream of spine board material and to at least an edge portion of each of the streams of leaf board material, and to depress the stream of hinge material into the two streams of leaf board material and to compress the stream of spine board material so as to render one side of the stream of hinge material essentially flush with one side of each of the streams of leaf board material, and further render the combined thicknesses of the streams of hinge material and spine board material essentially equal to the normal thickness of either of the streams of leaf board material.

It is another object of this invention to provide a cover board structure making apparatus wherein there are cutoff means adapted to receive a continuous stream of cover board structure material comprising a stream of spine board material and a stream of leaf board material joined to either side thereof; to sever separate cover board structures from this continuous stream, and to round the corners of these separate structures.

It is another object of this invention to provide a cover board structure making apparatus wherein there are bending means adapted to be fed with a continuous stream of cover board structure material comprising a stream of spine board material and a stream of leaf board material joined to either side thereof, and to impose a running trough-like curvature upon the stream of spine board material.

It is another object of this invention to provide a cover board structure making apparatus wherein there are perforating means adapted to be fed with a continuous stream of cover board structure material comprising a stream of spine board material and a stream of leaf board material joined to either side thereof, and to form holes for ring binder rivets in the spine board material at predetermined intervals along the stream thereof.

It is another object of this invention to provide a cover board structure making apparatus wherein there are the aforesaid cutoff, bending, and perforating means combined in a reciprocating type punch and die mechanism.

These and other objects of this invention as well as its nature and substance will be more clearly perceived and fully understood by referring to the following description and claims taken in connection with the accompanying drawings in which:

Figure 10:
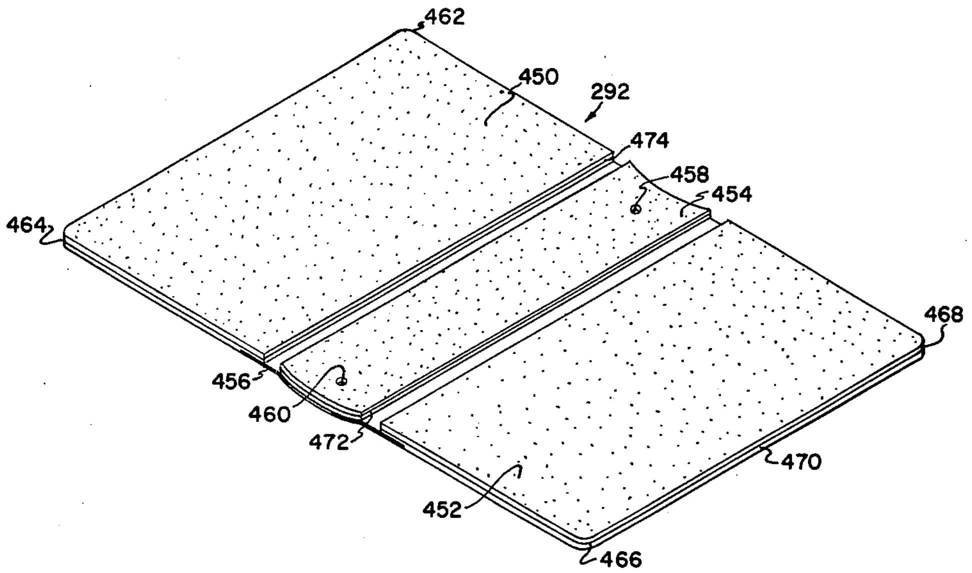
Figure 11:
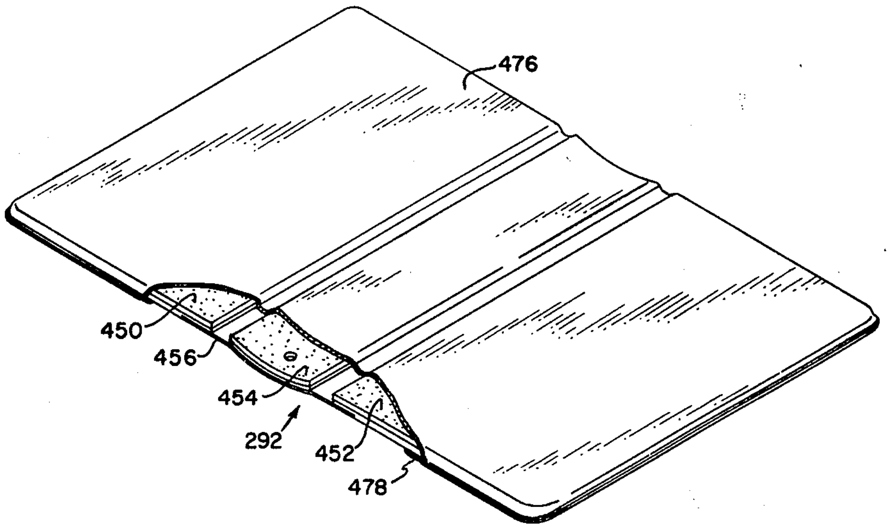

FIG. 10 represents an isometric view of a completed cover board structure for a loose leaf ring binder type note book as delivered by the cover board structure making apparatus of this invention, and FIG. 11 represents an isometric view of a loose-leaf, ring binder type note book cover board structure made according to this invention, this cover board structure being provided with a plastic jacket which is partly broken away.

Referring now to the drawings in detail, especially to FIGS. 1, 3, 5 and 7, the apparatus of the invention comprises two side plate assemblies 20 and 22 which are maintained in spaced, and substantially parallel relation by means of a plurality of cross bars or cross ties such as cross tie 24, and which are supported above the level of floor 26 by means of a plurality of leg members such as leg members 28 and 30. In their upper edges near their left hand ends, side plates 20 and 22 are notched to provide bearing and retaining surfaces for shafts 32 and 34 which extends through and beyond chipboard rolls 36 and 38 respectively. The chipboard in strip form which is wound into these rolls is a material suitable to form both the spine and the leaves of a book cover. It has a thickness usually lying in the range of 0.030 in. to 0.060 in. leaving it sufficient flexibility for winding, and, as used in the present invention, it has a width at least somewhat greater than the combined widths of the spine board and the two leaf boards of a cover board structure intended to be produced by the illustrated apparatus.

Chipboard strip 40 extending from roll 36 passes beneath idler rolls 42 and 44, and above lower roll 46 of a pair of press rolls 46 and 48. Chipboard strip 50 extending from roll 38 passes above upper roll 52 of a pair of glue rolls 52 and 54, and below upper press roll 48. Rolls 42, 44, 46, 48, 52, and 54 are all supported rotatably between side plates 20 and 22. The shafts of press rolls 46 and 48 are connected through gears 56 and 58, and those of glue rolls 52 and 54 through gears 60 and 62, gear 62 being located behind sprocket wheel 68 on the lower glue roll shaft. The shaft of upper press roll 48 is connected to that of lower glue roll 54 through sprocket chain 64 which passes over and around sprocket wheel 66 on the press roll shaft and sprocket wheel 68 on the glue roll shaft. Lower glue roll 54 is partially immersed in a body of liquid glue 70 of any suitable kind contained in a trough 72 which is supported between side plates 20 and 22 on a bracket 74.

To the right of and at essentially the same level as the pair of press rolls 46 and 48 are a pair of press rolls 76 and 78 and a pair of slitter rolls 80 and 82, all four of which rolls are supported rotatably between side plates 20 and 22. Each of the slitter rolls comprises a shaft and four slitter devices mounted upon it, for example, shaft 84 and slitter devices 86, 88, 90 and 92 of upper slitter roll 82. Between the upper and lower slitter rolls, the slitter devices which they comprise are paired in shearing alignment. The shafts of press rolls 76 and 78 are connected through gears 94 and 96, and those of slitter rolls 80 and 82 through gears 98 and 100, gear 98 being located behind sprocket wheel 114 on the lower slitter roll shaft. The shaft of lower press roll 76 is connected to that of lower press roll 46 through idler gear 102 which meshes with gears 94 and 56. The shaft of lower slitter roll 80 is connected to that of lower press roll 76 through idler gear 104 which meshes with gears 98 and 94. Idler gears 102 and 104 themselves are rotatably mounted on stub shafts extending outwardly from side plate 22.

Figure 3:
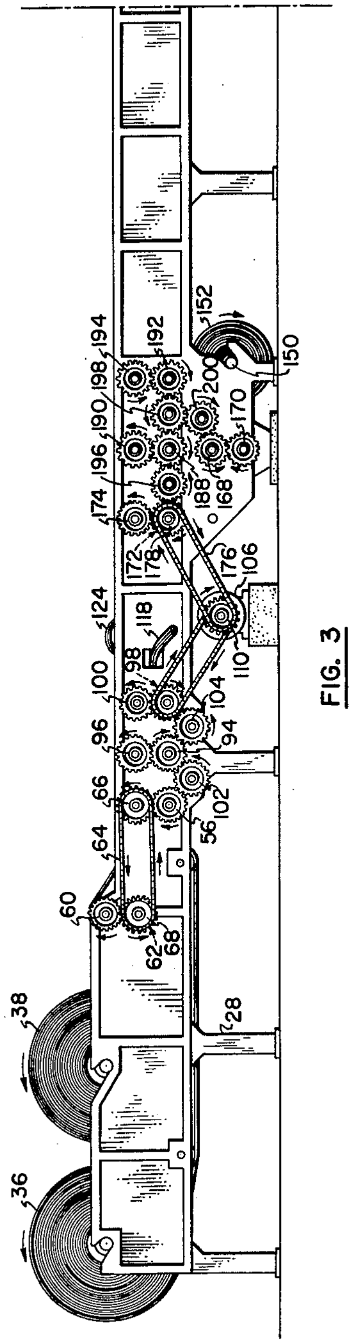
FIG. 3 represents an exterior view in longitudinal elevation of the portion of the cover board structure making apparatus of this invention shown in FIG. 1.

Mounted on floor 26 more or less below side plate 22 is a constant speed electric motor 106. On its output shaft this motor carrier an inner sprocket wheel 108 and an outer sprocket wheel 110. Motor 106 and lower slitter roll 80 are connected by means of sprocket chain 112 which passes over and around sprocket wheel 108 on the motor shaft and sprocket wheel 114 on the slitter roll shaft. Clockwise rotation of the shaft of motor 106 as seen in FIG. 3 causes rotation in the directions shown by the arrows in the figure of the various gears of the trains of gears meshed with lower slitter roll gear 98, and corresponding rotation of the various press, glue, and slitter rolls on the shafts of which several of these gears are mounted. This rotation is compatible with rightward movement of the chipboard strips 40 and 50, and such movement of these strips under the influence of pulling means described hereinafter is assumed.

As the glue rolls are rotated, lower roll 54 picks up a layer of liquid adhesive material from the body of glue within trough 70. Glue rolls 52 and 54 have at least a slight separation which is desirably subject to some adjustment through vertically shiftable mountings of one of the rolls in side plates 20 and 22. At least some of the layer of glue on lower roll 54 is transferred onto upper roll 52 in the course of the rolls' rotation. The greater the separation of the glue rolls, up to a point, the greater is the amount of glue transferred from the lower onto the upper roll. As chipboard strip 50 passes over upper glue roll 52 there is a further transfer of glue from this roll onto the under side of this strip.

The glue-coated under side of chipboard strip 50 comes into contact with the upper side of strip 40 as the two strips pass between press rolls 46 and 48, and a bond begins to be formed between the strips. At this point in their travel, strips 40 and 50 which are desirably although not absolutely necessarily of the same width are assumed to have fairly good but not necessarily substantially perfect edgewise alignment from side to side. From press rolls 46 and 48 the incipiently bonded strips pass between press rolls 76 and 78, and by the time they leave the latter pair of rolls the bond between them has been essentially fully made. Of each of the pairs of press rolls so far described at least one roll, for example, rolls 48 and 78, is on shiftable and adjustably spring-loadable mountings in side plates 20 and 22 so that the compression exerted on chips 40 and 50 as they pass through the pairs of rolls may be set properly for various thicknesses of strip materials.

After leaving press rolls 76 and 78, bonded strips 40 and 50 forming a stream of material sufficiently thick for use in a book cover pass into the bites of the slitter devices of slitter rolls 80 and 82. At their bites, upper slitter device 86 and the lower slitter device in shearing alignment with it are spaced from upper slitter device 92 and the lower slitter device in shearing alignment with that device by a distance equal to the combined widths of the spine board and the two leaf boards of the cover board structure intended to be produced. Upper slitter devices 88 and 90 as a pair are centered on shaft 84 with respect to upper slitter devices 86 and 92. At their bites, upper slitter device 88 and the lower slitter device in shearing alignment with it are spaced from upper slitter device 90 and the lower slitter device in shearing alignment with that device by a distance equal to the width of the spine board of the cover board structure desired to be produced.

Coming out from between the slitter rolls there are five streams of bonded or laminated chipboard material. Two of these, streams 116 and 118, are trim or waste streams which are discharged through appropriately positioned apertures in side plates 20 and 22 to suitable disposal regions not shown. Two more of these, streams 120 and 122, are streams from which a succession of leaf boards are to be cut, while the remaining one, stream 124, is a stream from which a succession of spine boards are to be cut. The leaf board and spine board streams which are esssentially contiguous immediately upon issuing from the slitter rolls assume an upwardly extending loop configuration above bracket or platform 126 which extends transversely between side plates 20 and 22 just beyond the slitter rolls.

The looped configuration of the leaf board streams gives them the necessary flexibility to be offset at least somewhat from the spine board stream. Thus on the lower ends of the right hand sides of their loops, as illustrated particularly in FIG. 5, leaf board streams 120 and 122 are offset from spine board stream 124 by the thicknesses of guide plates 128 and 130 respectively. These thicknesses are equal to the desired separations of the leaf boards from the spine board in a finished cover board structure. At their outer edges, the spine board streams are retained by guide plates 132 and 134.

Figure 7:
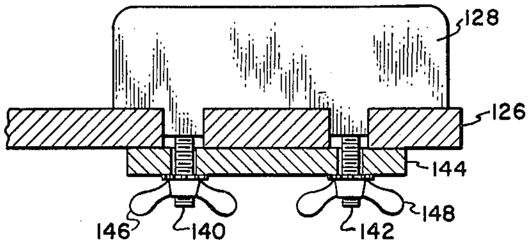
FIG. 7 represents an enlarged view of the showing in FIG. 1 of the slit cover board material guide means just ahead of the hinge paper pressing rolls.

Guide plates 128, 130, 132, and 134 all rest upon bracket or platform 126. The manner of installation of the four guide plates may be understood most clearly by referring to FIG. 7 showing the installation of guide plate 128 which is typical. Near its right hand end, platform 126 is characterized by two through-going, transversely extending slots designated 136 and 138 in FIG. 5. Two downwardly extending leg or tab portions of guide plate 128 have fairly close sliding fits in the platform slots. Set in and extending downwardly from these tab portions are threaded studs 140 and 142 which pass through clear holes in backing bar 144, and are fitted with wing nuts 146 and 148. By running the wing nuts up or down on the studs, guide plate 128 and backing bar 144 may be tightened against or loosened with respect to platform 126. With nuts 146 and 148 run down, guide plate 128 may be shifted into any desired transverse location on platform 126. After being appropriately located, the guid plate may be fixed in position by running up the wing nuts.

It is realized that the desired separations of the leaf boards from the spine board will not necessarily be the same for all production runs of the illustrated apparatus. One way in which account may be taken of this is by having a series of guide plates 128 and 130 of varying thicknesses. Another way is by using a pair of relatively thin guide plates in place of each of guide plates 128 and 130, and spreading the plates of each such pair on platform 126 as necessary to obtain the desired separations.

Somewhat to the right of the electric motor 106, a pair of opposite legs of side plates 20 and 22 are notched to provide bearing and retaining surfaces for shaft 150 which extends through and beyond hinge paper roll 152 which is in essentially transverse alignment with spine board stream 124. The hinge paper in strip or ribbon form which is wound into this roll is a material which is suitable to join the leaf and spine boards of a cover board structure. It is relatively quite thin compared to these boards. Hinge paper strip 154 extending from roll 152 passes over upper roll 156 of a pair of glue rolls 156 and 158, then under and up past idler roll 160, and then over lower roll 162 of a pair of hinge paper press rolls 162 and 164 which are at essentially the same level as the pair of slitter rolls 80 and 82.

Rolls 156, 158, 160, 162, and 164 are all supported rotatably between side plates 20 and 22. Lower glue roll 158 is partially immersed in a body of liquid glue of any suitable kind contained in a trough 166 which is supported from floor 26. The shafts of glue rolls 156 and 158 are connected through gears 168 and 170, and the shafts of press rolls 162 and 164 are connected through gears 172 and 174, gear 172 being located behind sprocket wheel 178 on the lower press roll shaft. The shaft of lower hinge paper press roll 162 is connected to that of electric motor 106 through sprocket chain 176 which passes over and around sprocket wheel 178 on the press roll shaft and outer sprocket wheel 110 on the motor shaft.

To the right of and at essentially the same level as the pair of hinge paper press rolls 162 and 164 are a pair of hinge paper indenting rolls 180 and 182 and a pair of pull rolls 184 and 186, all four of which rolls are supported rotatably between side plates 20 and 22. The shafts of indenting rolls 180 and 182 are connected through gears 188 and 190, and the shafts of pull rolls 184 and 186 are connected through gears 192 and 194. The shaft of lower hinge paper press roll 162 is connected to that of lower hinge paper indenting roll 180 through idler gear 196 which meshes with gears 172 and 188. The shaft of lower hinge paper indenting roll 180 is connected to that of lower pull roll 184 through idler gear 198 which meshes with gears 188 and 192. The shaft of lower hinge paper indenting roll 180 is connected to the shaft of upper glue roll 156 through idler gears 198 and 200, idler gear 200 meshing with idler gear 198 and also with gear 168 on the upper glue roll shaft. Idler gears 196, 198, and 200 are themselves rotatably mounted on stub shafts extending outwardly from side plate 22.

Clockwise rotation of the shaft of motor 106 as seen in FIG. 3 causes rotation in the directions shown by the arrows in this figure of the gears of the various trains of gears meshed with lower hinge paper press roll gear 172, and corresponding rotation of the various press, indenting, pull, and glue rolls on the shafts of which several of these gears are mounted. This rotataion is compatible with rightward movement of strips or streams of leaf boards 120 and 122, spine board 124, and, ultimately, hinge paper 154, and such movement of these strips under the influence of pull rolls 184 and 186 is assumed.

As glue rolls 156 and 158 are rotated, lower roll 158 picks up a layer of liquid adhesive material from the body of glue within trough 166, and transfers at least some of this layer onto upper glue roll 156. There is then a further transfer of glue from roll 156 onto hinge paper strip 154 which has a width at least somewhat greater than the combined widths of spine board strip 124 and the two separations between the spine board strip and the adjacent leaf board strips 120 and 122. As the hinge paper strip is passed over lower press roll 162, its glue-bearing upper surface is presented toward and in contact with the under sides of the leaf and spine board strips which also pass between hinge paper press rolls 162 and 164, and a bond begins to be formed between the hinge paper strip on the one hand and the leaf and spine board strips on the other.

From hinge paper press rolls 162 and 164 the incipiently bonded leaf board, spine board, and hinge paper strips pass between hinge paper indenting rolls 180 and 182. Upper hinge paper indenting roll 182 has a uniform diameter. Lower hinge paper indenting roll 180, however, has a portion of relatively large diameter in its middle, that is, in alignment with hinge paper strip 154, which has a length that is essentially equal to the width of the hinge paper strip. The diameter of this portion of relatively enlarged diameter is the same as the diameter of the upper hinge paper indenting roll. In other words, it may be said that on either side of its central portion lower hinge paper indenting roll 180 is cut down to a diameter at least somewhat smaller than the diameter of upper hinge paper indenting roll 182.

As the leaf board, spine board, and hinge paper streams pass between the indenting rolls, and particularly as the hinge paper stream passes over the central portion of lower indenting roll 180, the latter stream or strip is depressed into the two streams of leaf board material and the spine board strip or stream is compressed so as to render the edges of the under side of the hinge paper strip essentially flush with the under sides of the leaf board strips, and further render the combined thicknesses of the hinge paper and spine board strips essentially equal to the normal thickness of either of the leaf board strips or streams.

The lower indenting roll portion of enlarged diameter may be in the form of a keyed sleeve which is removable for installation and reinstallation in various lengths to confom with various widths of hinge paper strip 154.

By the time that the leaf board, spine board, and hinge paper streams issue from between hinge paper indenting rolls 180 and 182, the bond between the hinge paper streams on the one hand and the leaf board and spine board streams on the other is essentially fully set. After leaving the hinge paper indenting rolls, these bonded streams pass between upper and lower pull rolls 184 and 186, and after leaving the pull rolls they pass onto a generally depressed, longitudinally extensive pan or platform 202 supported between side plates 20 and 22. As they run along this platform the bonded leaf board, spine board, and hinge paper streams may simply be regarded as a stream or strip of cover board structure material 204.

Press rolls 46, 48, 76, 78, 162, and 164, and indenting rolls 180 and 182 and the sprocket wheel, sprocket chain, and gear drive systems for them should be so sized that these rolls run at surface speeds essentially equal to that of pull rolls 184 and 186, the two pull rolls, of course, having identical surface speeds. Glue rolls 52, 54, 156, and 158 should also have surface speeds essentially equal to that of pulls rolls 184 and 186. Slitter rolls 80 and 82 should turn at such a rate that they effect a crisp shearing action on the bonded or laminated chipboard strips passing between them. Press rolls 46 and 48, and also 76 and 78, are set sufficiently closely together and have sufficiently roughened or otherwise drag-inducing surfaces that they can pull chipboard materials from rolls 36 and 38 and drive them through the slitter rolls to maintain the upwardly-extending loops in these materials just after the slitter rolls.

Figure 1:
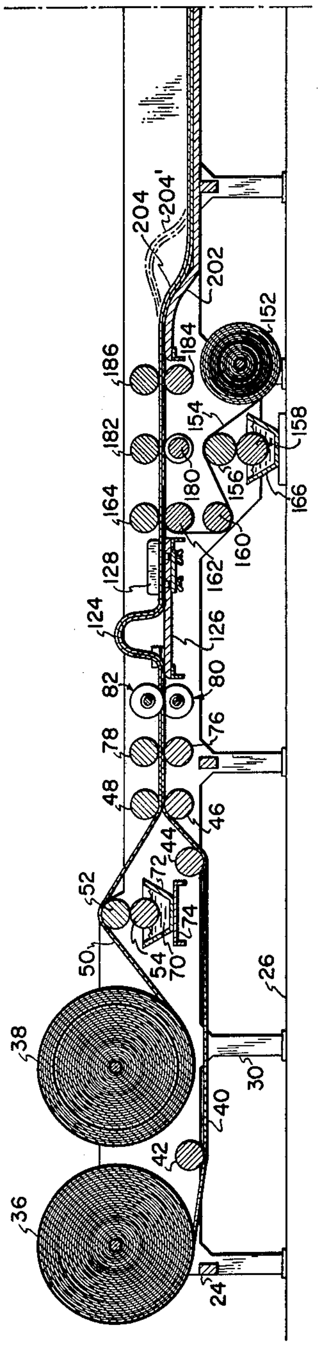
FIG. 1 represents a view in longitudinal sectional elevation of the cover board structure making apparatus of this invention from its loading end up to and somewhat beyond the pull rolls following the hinge paper indenting rolls taken along line 1—1 in FIG. 5 looking in the direction of the arrows.
Figure 2:
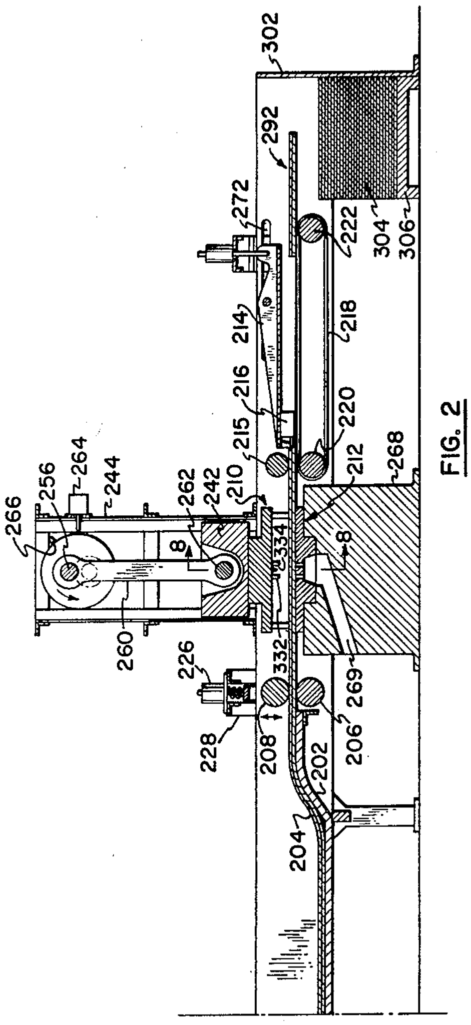
FIG. 2 represents a view in longitudinal sectional elevation of the cover board structure making apparatus of this invention in a continuation of the view of FIG. 1 through the discharge end of the apparatus taken along line 2—2 in FIG. 6 looking in the direction of the arrows.
Figure 4:
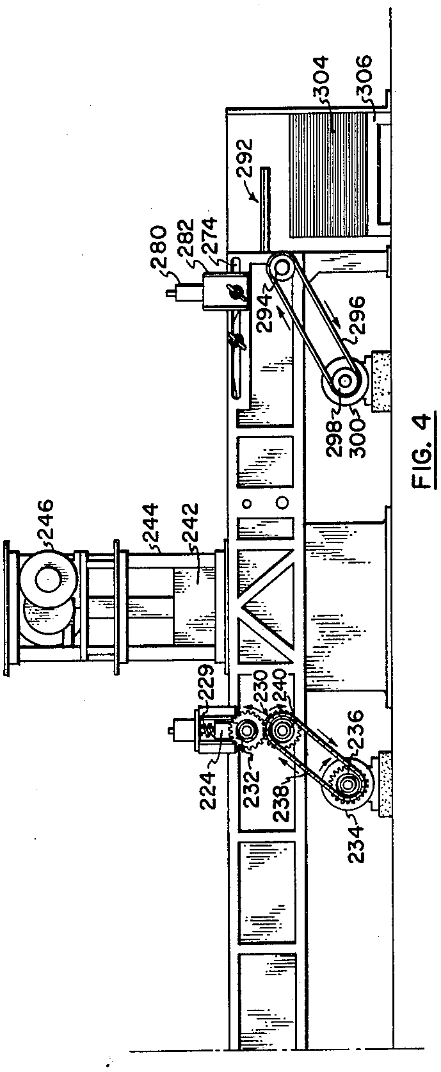
FIG. 4 represents an exterior view in longitudinal elevation of the portion of the cover board structure making apparatus of this invention shown in FIG. 2.
Figure 5:
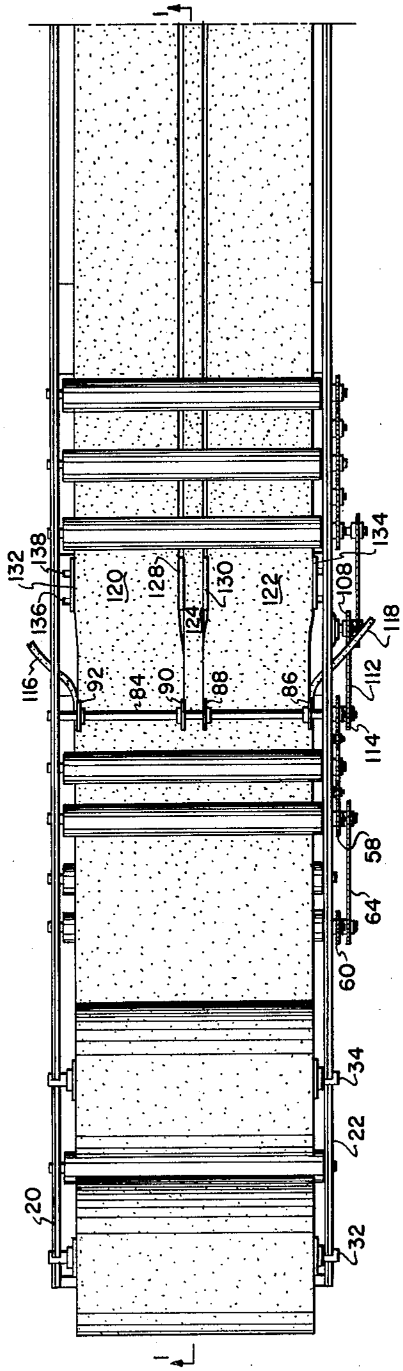
FIG. 5 represents a plan view of the portion of the cover board structure making apparatus of this invention shown in FIG. 3.
Figure 6:
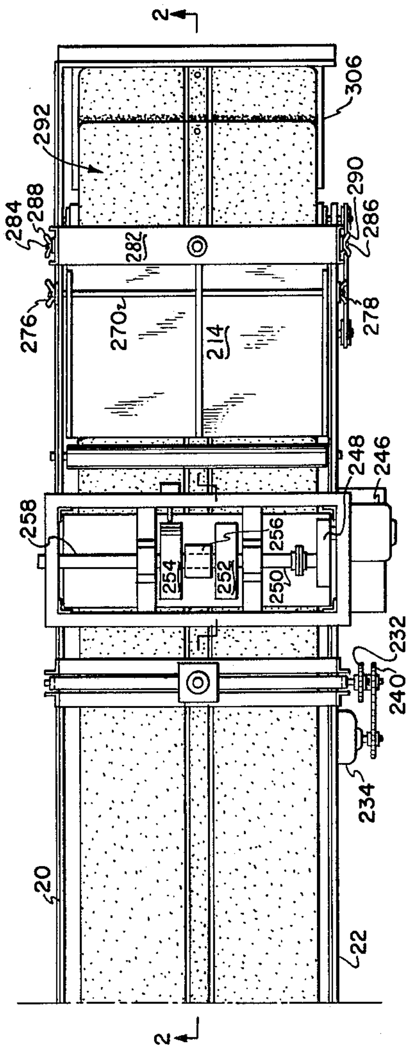
FIG. 6 represents a plan view of the portion of the cover board structure making apparatus of this invention shown in FIG. 4.

Referring next to FIGS. 2, 4 and 6, the stream of cover board structure material 204 is shown continuing all the way across platform 202, which platform rises at its right hand end to the same level as at its left hand end. After leaving platform 202, cover board structure material stream or strip 204 passes between pull rolls 206 and 208. Upon issuing from between these rolls, the stream of cover board structure material passes between punch and die assemblies 210 and 212, and finally terminates against a downwardly extending lip or flange on the left hand side of discharge gate 214 after passing below discharge idler pressure roll 215. On its under side, gate 214 carries an electric switch 216 of which the operating button or plunger normally extends leftwardly through an aperture in the gate lip, and so has been somewhat depressed by the right hand end of cover board structure material strip 204 bearing against it to achieve an effect described hereinafter. At its extreme right hand end as shown in FIG. 2, cover board structure material strip 204 has just come onto the upper, rightwardly running surface of discharge conveyor belt 218 which passes around discharge belt rolls 220 and 222, and against which belt strip 204 is held under at least some pressure by the action of idler pressure roll 215.

Lower pull roll 206 is supported rotatably between side plates 20 and 22. Upper pull roll 208 is located between side plates 20 and 22, but is actually rotatably supported between the legs of a yoke 224 which is in turn suspended from the downwardly extending plunger of an electric solenoid 226 mounted on a hanger frame 228 supported on the side plates. A compression spring 229 surrounds the plunger of solenoid 226 and tends to urge yoke 224 and upper pull roll 208 downwardly. The shafts of pull rolls 206 and 208 are connected through gears 230 and 232, gear 230 being located behind sprocket wheel 240 on the lower pull roll shaft. These gears do not go out of mesh when the plunger of solenoid 226 moves into its upper position lifting yoke 224, upper pull roll 208, and gear 232, and further compressing spring 229. Normally, that is, when solenoid 226 is deenergized, the solenoid plunger is lowered. The stroke of the solenoid is just enough that when its plunger is raised the pressure exerted on book cover material stream or strip 204 by pull rolls 206 and 208 falls to an essentially zero value, and so, accordingly, does the pulling effect exerted on this strip by these rolls. Drive is imparted to pull rolls 206 and 208 by variable speed electric motor 234. This motor has a sprocket wheel 236 on its output shaft, and a sprocket chain 238 runs over and around this wheel and sprocket wheel 240 on the shaft of lower pull roll 206. The shaft of motor 234 rotates in a clockwise direction as seen in FIG. 4 to produce the the desired directions of rotation of pull rolls 206 and 208.

Punch assembly 210 is supported from the lower side of piston or ram 242 which is capable of guided, vertical motion within a framework 244 supported on side plates 20 and 22 and foundation block 268. Mounted in the upper part of this framework there is an electric motor 246 having suitable gear head speed reducing means 248 through which it provides immediate drive for a shaft 250 supported in appropriate bearings. At its inner end, shaft 250 carries a flywheel 252. A second flywheel, flywheel 254, is connected to flywheel 252 by means of crank pin 256, and is carried on the inner end of a shaft 258 supported in appropriate bearings on framework 244. A connecting rod 260 extends from crank pin 256 to wrist pin 262 in ram 242. The actuating lever of an electric switch 264 mounted on framework 244 is in position to be tripped by cam or tripping finger 266 on flywheel 254 in the course of rotation of this flywheel. Tripping of the actuating lever of switch 264 achieves an effect described hereinafter.

When motor 246 is running it causes counterclockwise rotation of the flywheels as seen in FIG. 2. Ram 242 moves up and down in framework 244, and punch assembly 210 follows the motion of the ram, alternately moving toward and withdrawing from die assembly 212 which is supported from the floor by foundation block 268. The punch assembly, which is shown in somewhat greater detail in FIG. 8 described hereinafter performs a number of operations on cover board structure material strip 204 as it, the punch assembly, coacts with the die assembly. In one of these operations, a perforating operation, two holes for ring binder rivets are formed in the spine board portion of cover board structure material strip 204 on each downward stroke of the punch assembly. As formed, one hole is in the spine board of one cover board structure and the other hole is in the spine board of the next cover board structure of the succession of cover board structures to be severed from stream or strip 204. In another of these operations, a bending operation, a trough-like curvature is imposed upon a length of the spine board portion of cover board structure material strip 204 on each downward stroke of the punch assembly. As imposed, part of the curvature is upon the spine board of one cover board structure and part is upon the spine board of the next cover board structure of the succession of cover board structures to be severed from stream or strip 204.

In another of these operations, a corner rounding operation, a cut-out is effected in the outside edge of each of the leaf board portions of cover board structure material strip 204 on each downward stroke of the punch assembly. As effected, each of the cut-outs provides a rounded corner on a leaf board of one cover board structure and also a rounded corner on a leaf board of the next cover board structure of the succession of cover board structures to be severed from stream or strip 204. In another of these operations, a cutting off operation, one cover board structure is severed from the cover board structure material stream or strip 204 on each downward stroke of the punch assembly. As severed, the cover board structure is characterized by two rivet holes in its spine board, a trough-like curvature for the full length of its spine board, and two rounded corners on each of its leaf boards. The holes in the spine board of course extend through the hinge paper on the under side of this board, and the hinge paper is curved along with the spine board.

Material punched out of successive cover board structures in the course of perforating operations is discharged downwardly through die assembly 212 and then out through passage 269 in foundation block 268. Other passages, not shown, are provided in this block in alignment with openings in the die assembly to allow the discharge of material punched out of successive cover board structures in the course of corner rounding operations.

Discharge gate 214 is rotatably mounted on pivot rod 270. This rod is threaded at each end, and extends through horizontal slots 272 and 274 in side plates 20 and 22. At its ends, this rod carries wing nuts 276 and 278 which work against suitable washers including locking washers adapted to bear on the side plates. With the wing nuts run out on the rod, that is, in loose condition, pivot rod 270 may be shifted from right to left in slots 272 and 274 and vice versa to move discharge gate 214 either closer to or further away from punch and dies assemblies 210 and 212. With the gate properly located, wing nuts 276 and 278 are run in on pivot rod 270 to tighten themselves and their adjacent washers against side plates 20 and 22 and maintain the established longitudinal location of the discharge gate. This location should be such that the horizontal distance from the left hand surface of the lip at the left hand end of gate 214 to the edge of the cutting rule or other blade element in punch assembly 210 employed for severing succesive cover board structures from the stream of cover board structure material 204 is equal to the length of the cover board structure desired to be produced.

At its right hand end, discharge gate 214 is pivotably connected to the lower end of the downwardly extending plunger of an electric solenoid 280. This solenoid is mounted on a frame 282 which straddles and is slidably supported on side plates 20 and 22. Headed screws 284 and 286 having washers under their heads bearing against the inside surfaces of side plates 20 and 22 extend outwardly through slots 272 and 274 and vertically aligned clear holes in the leg members of frame 282. These screws carry wing nuts 288 and 290 which work against suitable washers including locking washers adapted to bear on the leg members of frame 282. With the wing nuts loose, frame 282 may be shifted from right to left on side plates 20 and 22 and vice versa. This frame must be moved right or left with discharge gate 214 on account of the connection between this gate and the plunger rod of solenoid 280. With the frame properly located, wing nuts 288 and 290 are tightened on their screws 284 and 286 to secure frame 282 in its established longitudinal location.

The stroke of the plunger of electric solenoid 280 is quite short being just enough that when the plunger goes down to depress the right hand end of discharge gate 214 the left hand end of the gate will, as the gate pivots about rod 270, rise sufficiently to permit the passage of a cover board structure such as cover board structure 292 under the lip or flange at the gate's left end, and also under switch 216 mounted on the gate. The discharge gate is unbalanced about pivot rod 270 in such direction that the left end of the gate tends to go down. This tendency is harmonious with the normal, that is, deenergized, condition of electric solenoid 280 in which the solenoid plunger is raised.

Discharge belt rolls 220 and 222 are supported rotatably between side plates 20 and 22, and the shaft of roll 222 carries a pulley 294. A drive belt 296, for example, a V-belt, runs over and around this pulley and over and around pulley 298 on the output shaft of electric motor 300. Clockwise rotation of the motor shaft as seen in FIG. 4 causes the upper run of discharge conveyor belt 218 to move to the right which is its desired direction of motion. Motor 300 turns at such a rate that the linear surface speed of discharge conveyor belt 218 is a good deal greater than the average speed of cover board structure material stream or strip 204 moving to the right. Discharge conveyor belt 218 may thus be thought of as being a high speed conveyor belt.

Coordinated operation of the apparatus of this invention shown in FIGS. 2, 4 and 6 will now be considered. Imagine that a stream of cover board structure material 204 has been moving to the right under the influence of pull rolls 184, 186, 206 and 208, yoke 224 being in lowered position with solenoid 226 deenergized; that it has passed between separated punch and die assemblies 210 and 212 with motor 246 turning and tripping finger 266 on flywheel 254 having recently passed the actuating lever of switch 264; that the left hand end of discharge gate 214 is lowered toward discharge conveyor belt 218 running at high speed; that a portion of the stream of cover board structure material 204 near the right hand end of this stream or strip has passed onto discharge conveyor belt 218 and beneath discharge idler pressure roll 215, and that the very right hand end of cover board structure material stream 204 has come and been stopped against the lip or flange at the left hand end of discharge gate 214, depressing the operating plunger of switch 216. This substantially describes the instantaneous condition of the apparatus appearing in FIGS. 2, 4 and 6 as this apparatus is shown in these figures.

Upon the operating plunger of switch 216 being depressed, the electrical circuit of solenoid 226 is completed and the solenoid plunger is raised to lift yoke 224 and upper pull roll 208. The driving or pulling force exerted upon cover board structure material stream or strip 204 by pull rolls 206 and 208 drops to substantially zero, and the strip continues to be driven only by pull rolls 184 and 186. Since strip 204 is held motionless at its extreme right hand end against the downwardly extending lip on discharge gate 214, continued driving of the stream or strip by pull rolls 184 and 186 causes growth of the existing or minimum desired slack in the strip represented by the shallow loop in the strip following closely along the depressed surface of pan or platform 202. As its slack grows, the cover board structure material strip may assume such a bulge off of platform 202 as that shown in broken outline designated 204'.

Motor 246 continues to turn the shafts, flywheels, and crank pin connected to its gear head speed reducer 248, and connecting rod 260, ram or piston 242, and punch assembly 210 complete a downward stroke against die assembly 212 with resultant perforating, bending, corner rounding, and cutting off operations described hereinbefore being performed. Further rotation of shafts 250 and 258, flywheels 252 and 254, and crank pin 256 causes punch assembly 210 to be lifted clear of die assembly 212, and also clear the cover board structure material lying on the die assembly. Shortly after the rising punch assembly clears this material, tripping finger 266 strikes and deflects the actuating lever of switch 264. Upon this actuating lever being deflected, the electrical circuit of solenoid 280 is completed and the solenoid plunger is depressed to lift the left hand end of discharge gate 214.

As the left hand of the discharge gate goes up, both the gate lip at this end which has been blocking rightward movement of cover board structure material stream or strip 204 and the operating plunger of switch 216 which has been depressed by the right hand end of the strip or stream are raised clear of this right hand end. The cover board structure which has just been severed from strip 204 is moved very rapidly to the right under discharge gate 214 by the friction pull exerted upon it by discharge conveyor belt 218. This pull is enhanced by the downward force exerted upon the severed structure by idler pressure roll 215. Prompt movement of the severed cover board structure to the right is essential in order to get the left hand end of this structure clear of switch 216 and the lip at the left hand end of discharge gate 214, for electric solenoid 280 is energized only briefly to depress the right hand end and raise the left hand end of this gate as tripping finger 266 on flywheel 254 passes the actuating lever of switch 264.

Discharge conveyor belt 218 should be sufficiently thick and sufficiently yielding that the curved spine board of the severed cover board structure san sink into it under the force exerted by idler pressure roll 215 without being flattened out. Alternatively, two discharge conveyor belts may be substiuted for the single illustrated belt 218, each of these substituted belts being of such width and disposition that it bears only upon a leaf board of the cover board structure. In line with this substitution, there would be a corresponding substitution of a pair of opposed stub rolls for conveyor belt roll 220, or at least provision of central circumferential grooving in this roll so that there would be no rigid structure against which idler pressure roll 215 could flatten out a curved spine board. Rolls 215 and 222 might also be centrally and circumferentially grooved or have pairs of opposed stub rolls substituted for them. If such substitution were made for conveyor belt roll 222, approriate dual drive provision for the substituted rolls from electric motor 300 would be made also.

Rightward movement of a severed cover board structure such as structure 292 is stopped by the structure's striking against baffle or buffer plate 302 which is joined at right angles to side plate assembly 20. Upon the movement of successive cover board structures being so stopped, these structures fall one after another onto and become parts of a cover board structure stack 304 resting upon platform or pedestal 306. This platform may be of a vertically movable, upwardly spring-loaded kind such that the first cover board structure falling onto it has only a short drop, the platform being depressed slightly each time a cover board structure is added to stack 304. At its right hand end, side plate assembly 22 stops short of buffer plate 302 to permit lateral access to cover board structure stack 304 for removal of a batch of finished cover board structures from time to time.

Upon the left hand end of discharge gate 214 being raised clear of the right hand end of the severed cover board structure, the operating plunger of switch 216 is no longer under restraint and snaps out to interrupt the electrical circuit of solenoid 226 and deenergize this solenoid. The solenoid plunger, yoke 224, and upper pull roll 208 then drop under the influence of gravity and compression spring 229, and the normal driving or pulling force exerted on cover board structure material strip 204 by pull rolls 206 and 208 tending to move this strip to the right is reestablished.

Once a severed, finished cover board structure such as structure 292 has begun to move to the right on account of the pull exerted upon it by discharge conveyor belt 218, the extreme right hand end of cover board structure material strip 204 from which the finished structure was severed is itself free for rightward movement. This movement will take place promptly on account of the resumed rightward drive exerted upon strip 204 by pull rolls 206 and 208. The surface speeds of these two pull rolls, which are identical, should be greater than those of pull rolls 184 and 186, likewise identical. This is necessary in order that during their period of active pulling rolls 206 and 208 may substantially dissipate the greater than minimum desired slack in cover board structure material strip 204 that was created between rolls 184 and 186 on the one hand and rolls 206 and 208 on the other hand during the period in which roll 208 was raised by action of solenoid 226 and rolls 206 and 208 were exerting essentially no pull on strip 204, this excess slack appearing as bulge 204'.

The speed control device or system of variable speed electric motor 234 which drives pull rolls 206 and 208 is adjusted as necessary to provide surface speeds of these rolls appropriate to the consideration just stated. Another consideration is that pull rolls 206 and 208 must drive cover board structure material strip 204 sufficiently slowly that the extreme right hand end of this strip starting out rightwardly from the plane of the cutting rule or other cover board structure material severing device of punch assembly 210 does not pass under the left hand end of discharge gate 214 before this end of this gate has come back down from its condition of momentary raising, and its downwardly extending lip is in position to block further rightward movement of strip 204. On the other hand, pull rolls 206 and 208 must drive cover board structure material strip 204 sufficiently rapidly that the extreme right hand end of the strip has been passed beneath idler pressure roll 215 and brought firmly against the discharge gate lip to depress fully the operating plunger of switch 216 before any portion of punch assembly 210 comes into contact with cover board structure material strip 204 during the next downward stroke of this assembly.

Besides motor 234, electric motor 246 which drives punch assembly 210 may be of the variable speed kind in order to provide a stroking rate of the punch assembly which is consistent with the average speed of advance of cover board structure material strip 204 set by pull rolls 184 and 186 and, in turn, by motor 106. On the other hand, motor 246 may be a fixed speed motor and be connected to shaft 250 through a variable ratio drive mechanism rather than through a gear head speed reducer. Motor 106 may run at a predetermined or reference speed according to which the speeds of motors 234 and 246 are adjusted to provide steady operation of the illustrated apparatus free from either undue slacking or tensile stressing of cover board structure material strip 204. Although serving as a speed reference, motor 106 need not be a fixed speed motor. Indeed, if it uses direct chain and sprocket drives as shown it should be a variable speed motor so that the illustrated apparatus may be brought up to speed gradually. Alternatively, motor 106 may be a fixed speed motor having its shaft connected to a variable ratio drive mechanism from which power is transmitted to chains 112 and 176.

Figure 8:
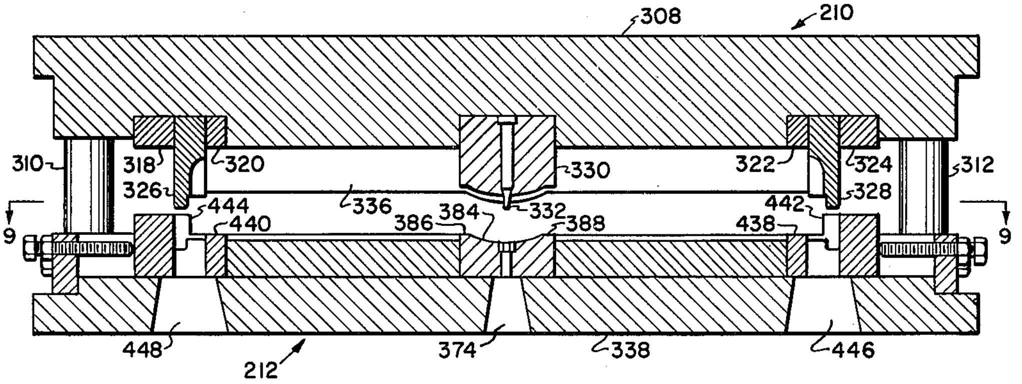
FIG. 8 represents an enlarged view in transverse sectional elevation of the cover board structure severing and spine curving and ring binder rivet hole forming punch and die assemblies of the cover board structure making apparatus of this invention taken along line 8—8 in FIG. 9 looking in the direction of the arrows, these assemblies being in separated condition.
Figure 9:
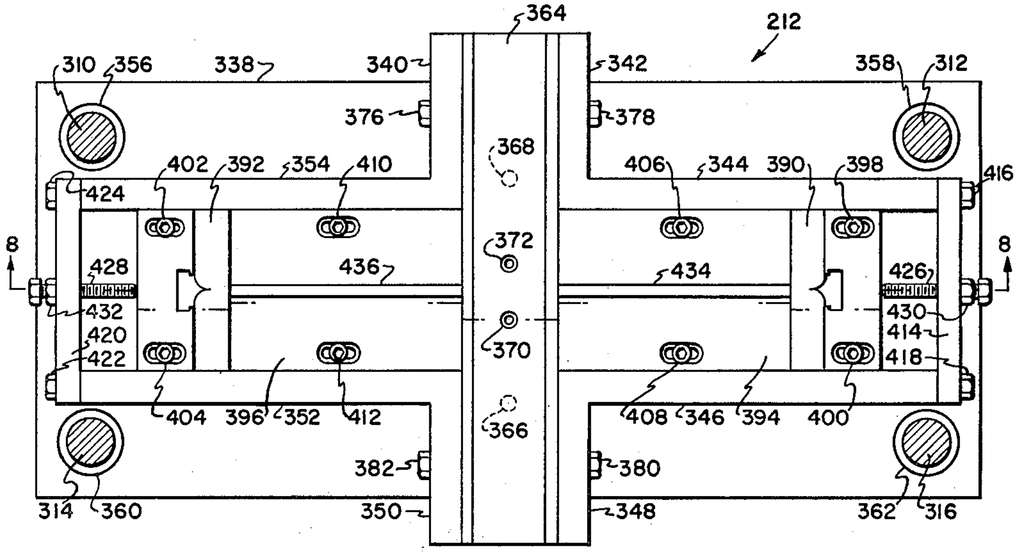
FIG. 9 represents a plan view of the cover board structure severing and spine curving and ring binder rivet hole forming die assembly of the cover board structure making apparatus of this invention taken along line 9—9 in FIG. 8 looking in the direction of the arrows.

Referring next to FIGS. 2, 8 and 9, punch assembly 210 comprises a base plate 308, four guide or aligning rods 310, 312, 314, and 316 fixedly fitted in the base plate, four corner rounding punch locating blocks 318, 320, 322, and 324 removably fitted in the base plate, two corner rounding punches 326 and 328 removably fitted in the base plate each between two locating blocks, a spine board curving punch 330 removably fitted in the base plate, two ring binder rivet hole perforating punches 332 and 334 removably fitted in the base plate within the spine board curving punch, and a cutting rule 336 held against base plate 308 in spine board curving punch 330 and in endwise abutment with the corner rounding punches.

Die assembly 212 includes a base plate 338. On its upper surface, this plate is characterized by eight ribs 340, 342, 344, 346, 348, 350, 352, and 354 in cruciform array. Near its corners, base plate 338 is characterized by four holes provided with bushings 356, 358, 360, and 362, through which guide rods 310, 312, 314, and 316 respectively have close sliding fits. A spine board curving die 364 is positioned in the interrupted groove defined between ribs 340 and 342 and ribs 348 and 350. This die is located longitudinally by dowels 366 and 368 which are fixedly fitted in the base plate and enter blind holes in the bottom surface of the die. Fitted within appropriately located through-going holes in spine board curving die 364 are two hardened bushings 370 and 372 for receiving the tip ends of perforating punches 332 and 334 on the downward strokes of punch assembly 210. Two holes in base plate 338, of which hole 374 is exemplary, are provided to pass material punched down and out through bushings 370 and 372. Positive retention of the spine board curving die on base plate 338 is effected by means of screws 376, 378, 380, and 382 which extend through ribs 340, 342, 348, and 350 into the die.

The upper or working surface of spine board curving die 364 comprises a central concave portion 384 and two outside flat portions 386 and 388. The widths of these three portions and the depth of the concave portion may be varied from die to die set in place on and in base plate 338 depending on the width and the desired depth of curvature of the spine board material portion of the cover board structure material stream or strip 204 to be curved in any particular production run. The spine board curving punch 330 used with any particular spine board curving die 364 must of course, have a lower surface which conforms to the upper surface of the die, and also provide appropriate positioning of the ring binder rivet hole perforating punches. Likewise, considering that severing of the cover board structure material strip takes place all across die 364, the cutting rule 336 used with any particular spine board curving die must have an edge which conforms to the upper surface of the die.

A corner rounding die 390 is positioned in the groove defined between ribs 344 and 346, and another corner rounding die 392 is positioned in the groove defined between ribs 352 and 354. Dies 390 and 392 are spaced out from die 364 by means of spacer pieces 394 and 396 respectively. Two retaining screws 398 and 400 pass through shouldered slots in die 390 and are threaded into base plate 338 with the heads of these screws being below the upper surface of the portion of the die through which they extend, and bearing on the slot shoulders to hold the die on the base plate. Corner rounding die 392 is held similarly by screws 402 and 404. Spacer piece 394 is held similarly by screws 406 and 408. Spacer piece 396 is held similarly by screws 410 and 412.

The outer end of the slot defined between ribs 344 and 346 is closed by means of a clamping screw adjusting block 414 which is fastened to ribs 344 and 346 by screws 416 and 418 respectively. The outer end of the slot defined between ribs 352 and 354 is closed by means of a clamping screw adjusting block 420 which is fastened to ribs 352 and 354 by screws 422 and 424 respectively. Clamping screws 426 and 428 are threaded through blocks 414 and 420 respectively, and at their points bear against corner rounding dies 390 and 392 respectively. Locking nuts 430 and 432 are provided on screws 426 and 428 respectively.

Spacer pieces 394 and 396 are provided with high and hardened central portions 434 and 436 respectively. As die assembly 212 is put together, the upper surfaces of these portions should be at essentially the same height as upper outside flat surfaces 386 and 388 of spine board curving die 364. They should also be at essentially the same height as horizontal surfaces 438 and 440 of corner rounding dies 390 and 392 respectively. Vertical surfaces 442 and 444 of the corner rounding dies give lateral definition to the path through die assembly 212 to be followed by cover board structure material stream or strip 204.

Fine adjustment of the spacing of surfaces 442 and 444 either side of the centerline of the die assembly may be obtained by inserting shims or thin spacer pieces in between the spine board curving die and the spacer pieces already defined and/or between these spacer pieces and the corner rounding dies. Such shims or thin spacer pieces should have surfaces to align with surfaces 386, 388, 434, 436, 438 and 440 so that there will always be a continuous surface on the die assembly against which the cutting rule of the punch assembly can act to sever successive cover board structures such as structure 292 from the stream or strip of cover board structure material 204.

The use of elongated slots in dies 390 and 392 and spacer pieces 394 and 396 through which the retaining screws pass allow these dies and spacer pieces to be shifted in or out along their retaining screws as shims or thin spacer pieces are removed or inserted as described hereinbefore and as clamping screws 426 and 428 are tightened against the corner rounding dies. During the making of adjustments to establish the proper spacing of surfaces 442 and 444, retaining screws 398, 400, 402, 404, 406, 408, 410, and 412 would be left loose. Then, after clamping screws 426 and 428 have been locked against dies 390 and 392, the retaining screws would be tightened to assist in holding the adjustment.

Gross as well as fine adjustments may be made in the spacing of surfaces 442 and 444 by using spacer pieces 392 and 394 of various lengths and also by changing the corner rounding dies themselves. However the spacing of the corner rounding dies is finally adjusted, the spacing and location of corner rounding punches 326 and 328 in punch assembly base plate 308 must be so established by the use of suitable punch locating blocks and shims that the corner rounding punches enter the corner rounding dies easily as punch assembly 210 is lowered toward die assembly 212. Cutting rule 336 must be changed in length with changes in spacing of the corner rounding punches. Two holes 446 and 448 in die assembly base plate 328 are provided to pass material punched down and out through the corner rounding dies.

Referring next to FIG. 10 cover board structure 292 made as described hereinbefore is seen to comprise leaf board portions 450 and 452, spine board portion 454, and hinge paper portion 456 which is indented flush into the under sides of the leaf board portions. The spine board portion is characterized by a perceptible curvature and also by ring binder rivet holes 458 and 460. This curvature and these holes are characteristics of the hinge paper portion as well. The leaf board portions are characterized by rounded outer corners 462, 464, 466, and 468.

It is to be noted in particular that each board portion comprises two layers of board material coming originally from chipboard rolls 36 and 38 unwinding into chipboard strips 40 and 50. The absolutely even alignment of the layers of chipboard in cover board structure 292, especially at the longitudinal edges of the leaf board and spine board portions of this structure, for example, edges 470, 472, and 474, is a feature of the structure, and results from the accurate, fully reliable, and economically accomplished trimming and slitting operations described hereinbefore which are performed on strips of chipboard already bonded. This feature together with the more basic feature of two leaf board portions and an interposed spine board portion held together by a hinge paper portion independently of the application of any casing or jacketing material are outstanding for purposes of the present invention. Other features such as round corners on the leaf board portions and ring binder rivet holes in and trough-like curvature of the spine board portion of a cover board structure are, of course, quite significant, but they or any of them may be omitted without defeating this invention in its broader aspects.

Structure 292 as shown is, of course, a loose-leaf, ring binder type note book cover board structure. After being removed either individually or as part of stack 304 from the illustrated apparatus of this invention, cover board structure 292 may be fed to a jacketing or casemaking machine and therein be provided with a cloth and/or paper jacket of a kind or kinds well known to the art glued all over it. In particular, the jacket material may be and will be pressed against and glued to both the upper and lower surfaces of hinge paper portion 456 between the spine and leaf board portions of cover board structure 292. The result will be, in effect, a bonded three-layer hinge structure joining spine board portions 454 and leaf board portions 450 and 452 of the jacketed cover board structure, this hinge structure being both very strong and very flexible.

Such an arrangement is in significant contrast to that of cloth and/or paper jacketed loose-leaf, ring binder type note book cover board structures of kinds generally known to the art. In a known structure of the kind most commonly used, the leaf board and spine board portions are entirely separate pieces when they are fed into the jacketing or casemaking machine; that is, they are not at that time connected one to another by any hinge material. Said in other words, the leaf board and spine board portions do not become parts of a coherent structure until jacket material is applied to them with this material providing the only hinge structure, at most a two-layer hinge structure whose two layers may or may not be bonded together.

In another known but not very widely used kind of structure, a board portion extends for the full width of the structure. This board portion has the thickness desired in the leaf board and spine board portions of the finished structure, and two grooves are routed in it to define a spine board portion between two leaf board portions and separated therefrom by two board portions of reduced thickness to act as hinges.

Material suitable for spine boards and leaf boards is not necessarily well suited to serve in hinges connecting such boards. If used in fairly thick form for hinges, it will be of reduced flexibility and furthermore will be susceptible to cracking as it is flexed repeatedly on a small radius. If used in fairly thin form to achieve flexibility, it will not have the strength of a comparable thickness of cloth, kraft paper, or latex saturated paper, each of which materials is well suited to serve as a hinge portion material within the contemplation of the present invention. A cover board structure of the second-described known kind may, of course, have the material of a cloth and/or paper jacket glued to both sides of its hinge portions to form three-layer hinge structures. Such structures will not, however, be as satisfactory as three-layer hinges within the scope of the present invention as so far described on account of noted deficiencies of the middle or board elements of these structures.

Referring finally to FIG. 11, cover board structure 292 is completely and continuously jacketed with a plastic material, specifically a vinyl material. This material is provided in two sheets defining an inner jacket 476 and an outer jacket 478 which are each slightly more extensive than cover board structure 292 laid out flat, and are bonded to enclose this structure by being pressed together at their edges at an elevated temperature, that is, heat sealed. Inner jacket 476 is shown as being depressed in the regions between spine board portion 454 and leaf board portions 450 and 452 so that it is in contact with essentially the full upper surface of hinge paper portion 456 exposed between the several board portions. Outer vinyl jacket 478 is, of course, in contact with the entire lower surface of hinge paper portion 456.

While the material whereby the leaf and spine board portions of a cover board structure made according to the present invention are joined or hinged has been referred to generally as a "paper" throughout this specification, it is to be understood that this expression has been used generically and for convenience and example, and not by way of limitation. Said in other words, the material in strip or ribbon form wound into and unwound from roll 152 certainly may be one which is ordinarily considered a paper, but it may also be one which is not ordinarily so considered. Specifically within the scope of the intended generic use of the word "paper," it may be polyvinylacetate coated paper, vinyl saturated paper, vinyl impregnated cloth, pure vinyl film, or indeed any flexible material to which vinyl sheets such as jacket sheets 476 and 478 may be heat sealed.

For purposes of the illustration of FIG. 11, it is intended that the material of hinge paper portion 456 be regarded as one to which vinyl sheets may be heat sealed, and that inner and outer jackets 476 and 478 have indeed been pressed against the upper and lower surfaces of the hinge material between the spine and leaf board portions to cover board structure 292 by suitable heating means so that a bond has been formed between each of the jacket sheets 476 and 478 and hinge paper portion 456. The result is, in effect, a very strong yet fully flexible bonded three-layer hinge structure joining spine board portion 454 and leaf board portions 450 and 452 of the jacketed cover board structure. This is in significant contrast to those jacketed structures known to the art in which the inner and outer vinyl jacket sheets bonded to each other form an entire two-layer hinging means; that is, structures which do not include any hinge portions such as portion 456 or integrally hinged continuous and routed board portions such as are occasionally used in cloth and/or paper jacketed cover board structures.

In those cases in which jacket material is to be bonded to hinge paper material, upper roll 156 of the pair of glue rolls 156 and 158 may be scraped with doctor blades as necessary so that it does not transfer any liquid adhesive onto the surface regions of hinge paper strip 154 which will come to lie between the spine board and leaf board portions of cover board structure material strip 204. Thus in a finished cover board structure severed from this strip there will be no exposed and unused adhesive or glue on the hinge paper strip between the spine and leaf board portions which might interfere in any way with the making of a heat sealed bond or joint between a vinyl jacket sheet and the hinge paper portion of the structure. Alternatively, a heat sealable glue or adhesive might be employed.

Ring binder rivet holes may be punched through inner and outer jackets in alignment with the existing holes in spine board portions 454 during the course of or just after the sealing operations on the jacket sheets. Most likely, however, the holes in the jacket sheets will not be punched until a ring binder mechanism is actually attached to a jacketed cover board structure.

The cover board structure of this invention so far described, cover board structure 292, for example, has included two leaf board portions, a spine board portion, and a hinge paper or hinge material portion. It is also, however, within the contemplation of this invention to provide a cover board structure which includes only two leaf board portions and a hinge material portion, the leaf board portions being joined in spaced relation by the hinge material portion with the cover board structure opened up and laid out flat. A cover board structure such as this will be useful in the manufacture of a book of a permanently bound nature. It is capable of being made by the apparatus and method of this invention as so far described with only comparatively minor modifications.

For the making of such a cover board structure for a permanently bound book, the chipboard in strip form which is wound into rools 36 and 38 has a width at least somewhat greater than the combined widths of the two leaf boards of the cover board structure intended to be produced. At their bites, upper slitter device 86 and the lower slitter device in shearing alignment with it are spaced from upper slitter device 92 and the lower device in shearing alignment with that device by a distance equal to the combined widths of the two leaf boards of the cover board structure intended to be produced. Upper slitter devices 88 and 90 and the lower slitter devices in shearing alignment with them are replaced by a single set of upper and lower slitter devices in shearing alignment centrally located on the shafts of the slitter rolls with respect to upper slitter devices 86 and 92 and the lower slitter devices in shearing alignment with them.

Guide plates 128 and 130 are so spaced on bracket or platform 126 that the distance between their outer surfaces is equal to the spacing between the leaf boards of the cover board structure intended to be produced. Guide plate 132 is so spaced from guide plate 128 that the distance between the inner surface of the former and the outer surface of the latter is equal to the intended width of a leaf board portion. Guide plate 134 has the same spacing from guide plate 130. The hinge paper or hinge material in strip form which is wound into roll 152 has a width at least somewhat greater than the spacing between the leaf boards of the cover board structure intended to be produced. The reciprocating-type punch and die mechanism includes cutting off means such as cutting rule 336, and it may include corner rounding means such as corner rounding punches 326 and 328 and corner rounding dies 392 and 390. It does not include either perforating means or bending means since neither one of these means is needed in the absence from the intended cover board structure of a spine board portion upon which to operate.

It is intended to secure protection by Letters Patent to the full extent that the prior art permits of this invention in all its aspects of book cover boards and board structures and apparatus and method for making the same as these aspects are defined in the appended claims.

What is claimed is:

1. A cover board structure for books, said structure comprising (1) a first multi-layer leaf board portion, (2) a second multi-layer leaf board portion, (3) a multi-layer spine board portion disposed between and in spaced relation to said first and second multi-layer leaf board portions, said first and second multi-layer leaf board portions each having rounded corners distant from said multi-layer spine board portion, and (4) a hinge material portion bonded to and extending across an entire outside surface of said multi-layer spine board portion but only a part of an outside surface of each said multi-layer leaf board portions, said hinge material being indented substantially flush into each of said multi-layer leaf board portions.

2. A cover board structure for books according to claim 1 in which said multi-layer spine board portion and the part of said hinge material portion bonded thereto are both characterized by a trough-like curvature.

3. A cover board structure for books according to claim 1 in which said multi-layer spine board portion and the part of said hinge material portion bonded thereto are both characterized by a plurality of ring binder rivet holes.

4. A jacketed cover board structure for books, said structure comprising (1) a basic cover board structure including (i) a first multi-layer leaf board portion, (ii) a second multi-layer leaf board portion, (iii) a multi-layer spine board portion disposed between and in spaced relation to said first and second multi-layer leaf board portions, said first and second multi-layer leaf board portions each having rounded corners distant from said multi-layer spine board portion, and (iv) a hinge material portion bonded to and extending across an entire outside surface of said multi-layer spine board portion but only a part of an outside surface of each of said multi-layer leaf board portions, said hinge material being indented substantially flush into each of said multi-layer leaf board portions, and (2) a jacket enclosing said basic cover board structure essentially completely and continuously, said jacket being bonded to both sides of the hinge material portion of said basic cover board structure between the spine board portion and each of the leaf board portions thereof.

5. A cover board structure for books, said structure comprising (1) a first multi-layer leaf board portion, (2) a second multi-layer leaf board portion, (3) a multi-layer spine board portion disposed between and in spaced relation to said first and second multi-layer leaf board portions, and (4) a hinge material portion bonded to said first multi-layer leaf board portion, said multi-layer spine board portion, and said multi-layer second leaf board portion, said hinge material being indented substantially flush into each of said multi-layer leaf board portions and being of a material amenable to having vinyl sheet material heat sealed thereto.

6. A cover board structure for books according to claim 5 in which the material of said hinge material portion is polyvinylacetate coated paper.

7. A cover board structure for books according to claim 5 in which the material of said hinge material portion is vinyl impregnated cloth.

8. A cover board structure for books according to claim 5 in which the material of said hinge material portion is vinyl film.

9. A jacketed cover board structure for books, said structure comprising (1) a basic cover board structure including (i) a first leaf board portion, (ii) a second leaf board portion, (iii) a spine board portion disposed between and in spaced relation to said first and second leaf board portions, and (iv) a hinge material portion bonded to said first leaf board portion, said spine board portion, and said second leaf board portion, and (2) a vinyl jacket enclosing said basic cover board structure essentially completely and continuously, said vinyl jacket being bonded to both sides of the hinge material portion of said basic cover board structure between the spine board portion and each of the leaf board portions thereof, said bond being of a heat sealed nature.

10. A method of making cover board structures for books in which each structure made includes a spine board portion and two leaf board portions, said method comprising the steps of (1) generating two continuous streams of board material, each stream having a width at least somewhat greater than the combined widths of the spine board and two leaf board portions of the cover board structure desired to be produced; (2) bringing said streams into at least rough superimposed running alignment; (3) applying an adhesive material onto at least one stream on its face directed toward the other stream; (4) pressing said streams together with the formation of a bond between them and the generation of a continuous two-layer stream of board material; (5) making a trimming cut along each edge of said two-layer stream to remove at least some material from each edge of each of its layers and reduce its width to a value equal to that of the combined widths of the spine board portion and two leaf board portions of the cover board structure desired to be produced; (6) slitting said stream to divide it into two leaf board portion streams and an interposed spine board portion stream; (7) separating each of said leaf board portion streams outwardly from said spine board portion stream by a predetermined distance so that the leaf board portion streams run parallel and in spaced relation to the spine portion stream; (8) generating a continuous stream of adhesive hinge material at least somewhat wider than the combined widths of the spine board portion stream and its separations from the two leaf board portion streams; (9) bringing said stream of adhesive hinge material into substantially central alignment with said spine board portion stream; (10) pressing said stream of adhesive hinge material against the whole of one side of said spine board portion stream and at least part of one side of each of said leaf board portion streams with the formation of bonds between the hinge material stream and the spine and leaf board portion streams and the generation of a continuous stream of cover board structure material, and (11) severing successive cover board structures from said stream of cover board structure material.

11. A method of making cover board structures for books according to claim 10 which further comprises the step of rounding two corners on the leaf board portions of the farthest advanced cover board structure in the stream of cover board structure material and also rounding two corners on the leaf board portions of the cover board structure next farthest advanced, this step and the step of severing the farthest advanced cover board structure from the stream of cover board structure material being performed essentially simultaneously.

12. A method of making cover board structures for books according to claim 10 which further comprises the step of punching at least one ring binder rivet hole in the spine board portion and hinge material bonded thereto of the farthest advanced cover board structure in the stream of cover board structure material and also punching at least one ring binder rivet hole in the spine board portion and hinge material bonded thereto of the cover board structure next farthest advanced, this step and the step of severing the farthest advanced cover board structure from the stream of cover board structure material being performed essentially simultaneously.

13. A method of making cover board structures for books according to claim 10 which further comprises the step of imposing a trough-like curvature on at least part of the length of the spine board portion and hinge material bonded thereto of the farthest advanced cover board structure in the stream of cover board structure material and also imposing a trough-like curvature on at least part of the length of the spine board portion and hinge material bonded thereto of the cover board structure next farthest advanced, the first-designated part curved and the second-designated part curved together having a length at least equal to the length of the spine board portion of each cover board structure made, this step and the step of severing the farthest advanced cover board structure from the stream of cover board structure material being performed essentially simultaneously.

14. A method of making cover board structures for books in which each structure made includes two leaf board portions and a hinge material portion, said method comprising the steps of (1) generating a continuous stream of board material having a width at least somewhat greater than the combined widths of the two leaf board portions of the cover board structure desired to be produced; (2) making a trimming cut along each edge of said stream to reduce its width to a value equal to that of the combined widths of the two leaf board portions of the cover board structure desired to be produced; (3) slitting said stream to divide it into two leaf board portion streams; (4) generating a continuous stream of adhesive hinge material at least somewhat narrower than the combined widths of the two leaf board portions of the cover board structure desired to be produced; (5) bringing said stream of adhesive hinge material into substantially central alignment with said leaf board portion streams; (6) pressing said stream of adhesive material against part of one side of each of said leaf board portion streams and indenting said stream of adhesive material into said parts of said leaf board portion streams with the formation of bonds between the hinge material and leaf board portion streams and the generation of a continuous stream of cover board structure material, (7) severing successive cover board structures from said stream of cover board structure material and (8) rounding two corners on the leaf board portions of the farthest advanced cover board structure in the stream of cover board structure material and also rounding two corners on the leaf board portions of the cover board structure next farthest advanced essentially simultaneously with said step of severing successive cover board structures.

15. A method of making cover board structures for books in which each structure made includes two leaf board portions and a hinge material portion, said method comprising the steps of (1) generating two continuous streams of board material, each stream having a width at least somewhat greater than the combined width of the two leaf board portions of the cover board structure desired to be produced; (2) bringing said streams into at least rough superimposed running alignment; (3) applying an adhesive material onto at least one stream on its face directed toward the other stream; (4) pressing said streams together with the formation of a bond between them and the generation of a continuous two-layer stream of board material; (5) making a trimming cut along each edge of said two-layer stream to remove at least some material from each edge of each of its layers and reduce its width to a value equal to that of the combined widths of the two leaf board portions of the cover board structure desired to be produced; (6) slitting said stream to divide it into two leaf board portion streams; (7) separating said leaf board portion streams outwardly from each other by a predetermined distance so that the leaf board portion streams run parallel and in spaced relation to each other; (8) generating a continuous stream of adhesive hinge material at least somewhat wider than the separation between the streams of leaf board material; (9) bringing said stream of adhesive hinge material into substantially central alignment with said leaf board portion streams; (10) pressing said stream of adhesive hinge material against at least part of one side each of said leaf board portion streams with the formation of bonds between the hinge material stream and the leaf board portion streams and the generation of a continuous stream of cover board structure material, and (11) severing successive cover board structures from said stream of cover board structure material.

16. A method of making cover board structures for books according to claim 15 which further comprises the step of rounding two corners on the leaf board portions of the farthest advanced cover board structure in the stream of cover board structure material and also rounding two corners on the leaf board portions of the cover board structure next farthest advanced, this step and the step of severing the farthest advanced cover board structure from the stream of cover board structure material being performed essentially simultaneously.

17. A method of making cover board structures for books in which each structure made includes a spine board portion and two leaf board portions, said method comprising the steps of (1) generating a continuous stream of board material having a width at least somewhat greater than the combined widths of the spine board portion and two leaf board portions of the cover board structure desired to be produced; (2) making a trimming cut along each edge of said stream to reduce its width to a value equal to that of the combined widths of the spine board portion and two leaf board portions of the cover board structure desired to be produced; (3) slitting said stream to divide it into two leaf board portion streams and an interposed spine board portion stream; (4) generating a continuous stream of adhesive hinge material at least somewhat wider than the spine board portion stream but narrower than the combined widths of the spine board portion and two leaf board portions of the cover board structure desired to be produced; (5) bringing said stream of adhesive hinge material into substantially central alignment with said spine board portion stream; (6) pressing said stream of adhesive hinge material simultaneously against the whole of one side of said spine board portion stream and part of one side of each of said leaf board portion streams with the formation of bonds between the hinge material and the spine and leaf board portion stream and the generation of a continuous stream of cover board structure material; (7) severing successive cover board structures from said stream of cover board structure material, and (8) rounding four corners on the leaf board portions of each cover board structure severed from the stream of cover board structure material.

References Cited by the Examiner

UNITED STATES PATENTS

| | | | |
|---|---|---|---|
| 2,166,038 | 7/39 | Chambon | 156—479 |
| 2,339,586 | 1/44 | Roberts | 281—29 |
| 2,390,125 | 12/45 | Schade | 281—29 |
| 2,486,330 | 10/49 | Schade | 281—29 |
| 2,556,787 | 6/51 | Bach et al. | 156—363 |
| 2,641,484 | 6/53 | Brody | 281—34 |
| 2,772,427 | 12/56 | Rankin | 281—36 X |
| 2,922,172 | 1/60 | Boyle | 156—516 |
| 3,145,033 | 8/64 | Caddoo | 281—29 |

FOREIGN PATENTS

| | | |
|---|---|---|
| 1,041,118 | 5/53 | France. |
| 796,063 | 6/58 | Great Britain. |

EUGENE R. CAPOZIO, *Primary Examiner.*

LAWRENCE CHARLES, JEROME SCHNALL, *Examiners.*